United States Patent

Tanaka et al.

[11] 4,124,274
[45] Nov. 7, 1978

[54] ZOOM LENS HAVING CLOSEUP FOCUSING CONTROL

[75] Inventors: Kazuo Tanaka; Kunio Takeshi, both of Tokyo, Japan

[73] Assignee: Canon Kabushiki Kaisha, Tokyo, Japan

[21] Appl. No.: 761,960

[22] Filed: Jan. 24, 1977

[30] Foreign Application Priority Data

Jan. 28, 1976 [JP] Japan ................... 51-8096

[51] Int. Cl.² .................................. G02B 15/18
[52] U.S. Cl. .................................. 350/184
[58] Field of Search ................ 350/184, 186, 255

[56] References Cited

U.S. PATENT DOCUMENTS

| | | | |
|---|---|---|---|
| 3,533,679 | 10/1970 | Baluteau | 350/186 |
| 3,549,235 | 12/1970 | Macher | 350/184 |
| 3,632,188 | 1/1972 | Nakamura | 350/214 X |

*Primary Examiner*—Paul A. Sacher
*Attorney, Agent, or Firm*—Toren, McGeady and Stanger

[57] ABSTRACT

A zoom lens comprising a front lens group, a plurality of movable lens groups and an image forming lens group, the front lens group having three sub-groups. The first sub-group counting from the front has a negative refractive power and is movable for focusing purposes. The intermediate or second sub-group has a positive refractive power and is movable for focusing to the front of the third sub-group which has a positive refractive power and which is stationary during focusing. The front lens group is characterized by fulfilling the following relationships:

$$0 < |f_1| + d < 2f_2$$
$$0 < |\frac{a'f_1}{a' + f_1}| + d + |S| + |t| < 2f_2$$

wherein $f_1$ and $f_2$ are the focal lengths of the first and second sub-groups respectively; $d$ is the axial separation between the rear principal point of the first sub-group and the front principal point of the second sub-group occurring when the entire system is focused for object at infinity; $a'$ is the object distance measured from the front principal point of the first sub-group when the entire system is focused for an object at a finite distance; and S and t are the amounts of movement of the first and second sub-groups resulted during focusing from infinity to a closeup at an object distance $a'$ respectively.

7 Claims, 9 Drawing Figures

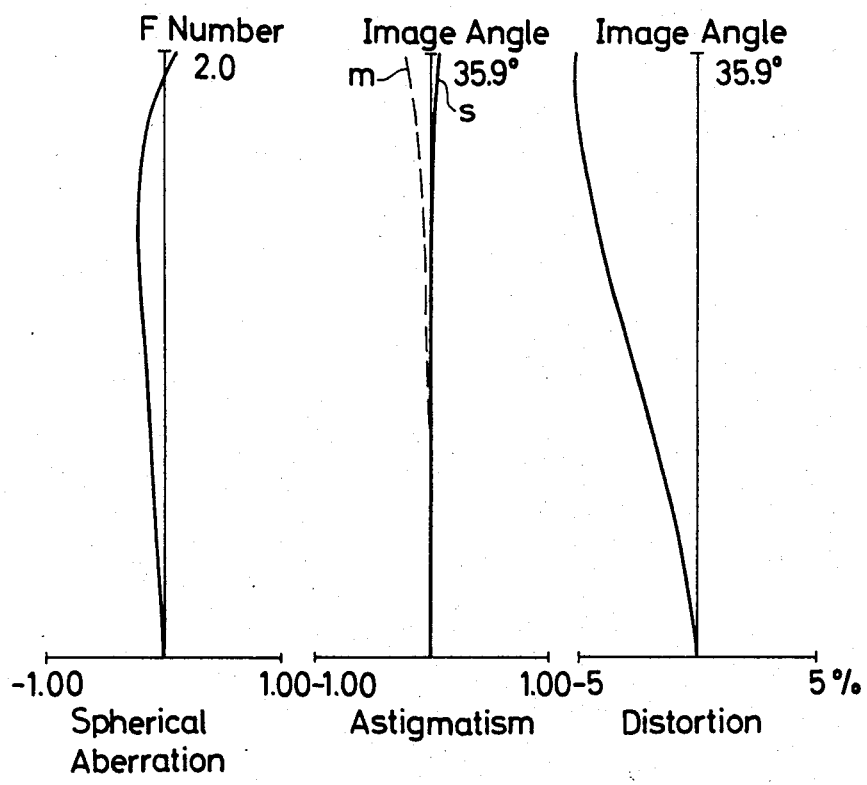

ZOOM LENS HAVING CLOSEUP FOCUSING CONTROL

BACKGROUND OF THE INVENTION

This invention relates to variable focal length lenses or so-called zoom lenses for use with photographic cameras or television cameras and, more particularly, to a zoom lens objective having focusing control suited for photography at wide angle. Still more particularly, it relates to improvements of a zoom lens objective of the type disclosed in applicants' copending application Ser. No. 746,203 filed Dec. 1, 1976.

This type of zoom lens objective consists of three distinct sections, a zooming section having a plurality of movable lens groups by which the focal length of the entire optical system can be continuously varied throughout a range while maintaining constant the position of the image plane for an object at any distance, a focusing section positioned in front (on the object side) of the zooming section and having a function of providing a constant object point (image point of the object being photographed) with respect to the zooming section regardless of change in the object distance, and a fixed lens group (relay lens) positioned in the rear (on the image side) of the zooming section, the objective being well corrected for the various aberrations throughout the zooming range as well as throughout the focusing range.

In recent zoom objectives, the zooming range must be extended toward shorter focal lengths with simultaneous achievement of wider image angles and also must have a focusing control element capable of focusing down to shorter object distances. For these purposes, the part of the objective to be movable for focusing is required not only to provide an increased lens aperture but also to be of a relatively complex structure, or otherwise it would be made impossible to secure the desired wide angle of view at the minimum focal length region and to achieve good state of correction of aberrations not only throughout the zooming range but also throughout the focusing range from the infinitely focused position to close up positions. This complexity makes the proportion of the weight of the focusing control lens group quite large relative to the rest of the complete objective with the corresponding increase in the weight of the focusing mechanism as compared with the prior art.

In order to minimize the size and weight of the complete objective including its operating mechanism to easily manageable proportions, it has been the prior art practice, instead of making the front lens group bodily movable for focusing, to divide such front lens group into two parts. One such part is movable for focusing and another part which remains stationary during focusing and which is especially designed to facilitate correction of the various aberrations, as, for example, disclosed in British Pat. No. 975,160. There the front lens group is divided into a negative part and a positive part, only the negative part being axially movable. U.S. Pat. No. 3,682,534 calls for the front lens group consist of two negative sub-groups only the rear sub-group being axial movable. U.S. Pat. No. 3,598,476 discloses that the front lens group is divided into a negative front part, a positive intermediate part with and a negative rear part only the intermediate part being axially movable toward the front with decrease in the object distance. The zoom objective adapted for macro-range photography mention may be those disclosed in Japanese patent publication Nos. Sho 47-42174, Sho 49-7752 and Sho 49-7753.

SUMMARY OF THE INVENTION

The general object of the present invention is to provide a zoom lens having a focusing provision made minimum in its size, weight and complexity and well corrected for high grade imaging performance particularly at an extended image angle in the minimum focal length region which has heretofore been considered almost impossible to design.

The zoom lens of the present invention as its general configuration has a front lens group, two or three lens groups movable for variation of the focal length of the entire system and including a variator and a compensator, and an image-forming lens group which is stationary during zooming and during focusing. The front lens group consists of three sub-groups, only the front and intermediate ones of which are movable in the opposite directions to each other to effect focusing for differing object distances, and the rear one of which is stationary during focusing, whereby the rear sub-group is employed to facilitate aberrational correction and to minimize the diameters of the preceding two sub-groups.

BRIEF DESCRIPTION OF THE DRAWINGS

FIGS. 4, 5 and 6 are graphs of the spherical aberration, astigmatism and distortion of the zoom lens of FIG. 1 respectively when zoomed in the wide angle setting with object at a close up distance.

DESCRIPTION OF THE PREFERRED EMBODIMENT

Figure 1:
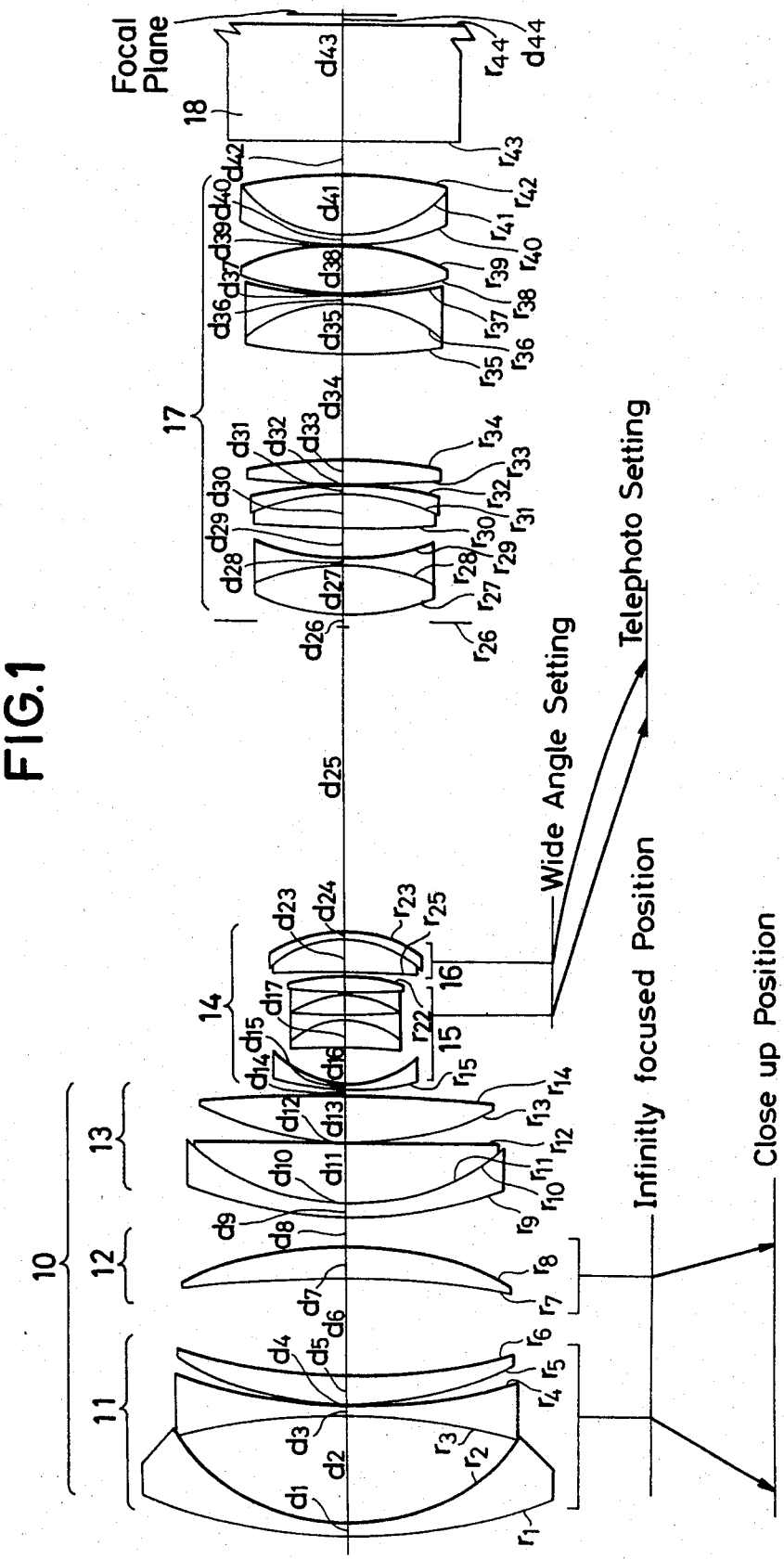
FIG. 1 is a block diagram of one embodiment of a zoom lens according to the present invention adapted for use with a television camera.

Referring to FIG. 1, there is shown one embodiment of a zoom lens according to the present invention including a front lens group 10 which consists of a first sub-group 11 counting from the front having a negative focal length, a second sub-group 12 having a positive focal length and a third sub-group 13 having a positive focal length, the first and second sub-groups 11 and 12 being axially moved forwards and backwards respectively as focusing is performed from an infinitely distant object position to a close up object position, while the third sub-group 13 is maintained stationary during focusing, and the overall focal length of the front lens group 10 is positive. The front group 10 is followed by two lens groups movable for zooming, namely, a variator 15 and a compensator 16 to the front of an image-forming lens group or relay lens 17. A diaphragm is located just in front of the relay lens 17. Positioned between the relay lens 17 and the focal plane there is a beam splitter 18 equivalent to a color selection prism of the color television camera.

Such front lens group 10 is characterized by the following relationships:

$$0 < |f_1| + d < 2f_2 \quad \text{(a)}$$

$$0 < \left| \frac{a'f_1}{a' + f_1} \right| + d + |S| + |t| < 2f_2 \quad \text{(b)}$$

wherein $f_1$ and $f_2$ are the focal lengths of the first and second sub-groups respectively; $d$ is the axial separation between the rear principal point of the first sub-group and the front principal point of the second sub-group occurring when the entire lens system is focused for an infinitely distant object; $a'$ is the object distance measured from the front principal point of the first sub-group when the entire system is focused for an object at a finite distance; and $S$ and $t$ are the amounts of movement of the first and second sub-groups respectively effected when focusing is performed from the infinitely distance object position to a particular position for object at a finite distance, $a'$. In connection with these relationships it should be explained that as the first sub-group forms a virtual image of the object, when this virtual image is regarded as a second object, the second sub-group serves as a magnification system for this second object with $|\beta| > \beta 1$ wherein $\beta$ is the lateral magnification, and that when the distance between the point at which the virtual image is formed by the first sub-group and the second sub-group is less than $f_2$, the second sub-group produces a virtual image, and when not less than $f_2$ but less than $2f_2$, this image becomes real.

In order to maintain constant the position of the image plane during focusing, it is required that a relationship between the amount of movement $S$ of the first sub-group and the amount of movement $t$ of the second sub-group must be established as expressed by the following formula:

$$t = -\frac{Y}{2X}\left(1 - \sqrt{1 - \frac{4xZ}{Y^2}}\right) \quad \text{(c)}$$

where
$X = CF\phi_2 - C\phi_1\phi_2 S$
$Y = -AF\phi_2 + A\phi_1\phi_2 S + CF - C\phi_1 S - CG + C^2 S - CF\phi_2 S + C\phi_1\phi_2 S^2$
$Z = AG + AF\phi_2 S - A\phi_1\phi_2 S^2 - EC - CFS + C\phi_1 S^2$
$A = 1 - \phi_1 d$
$B = -d$
$C = -\phi_1\phi_2 d + \phi_1 + \phi_2$
$D = 1 - d\phi_2$
$E = a \cdot A + B$
$F = a\phi_1 + 1$
$G = aC + D$
$\phi_1 = 1/f_1, \phi_2 = 1/f_2$ wherein $\phi_1$ and $\phi_2$ are the powers of the first and second subgroups respectively; and $a$ is the distance between the object at a finite distance and the front principal point of the first subgroup in the infinitely focused position.

Figure 2:
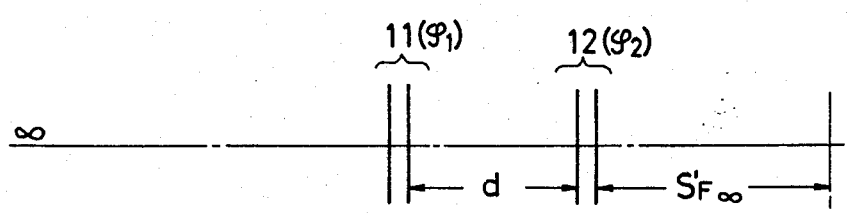
FIGS. 2 and 3 are diagrams considered in deriving the relationships which the front lens group of FIG. 1 must fulfil.
Figure 3:
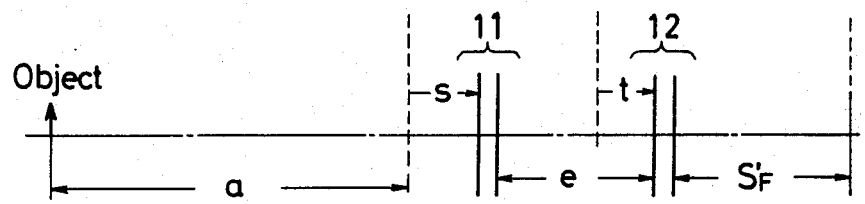
Figures 7, 8, 9:
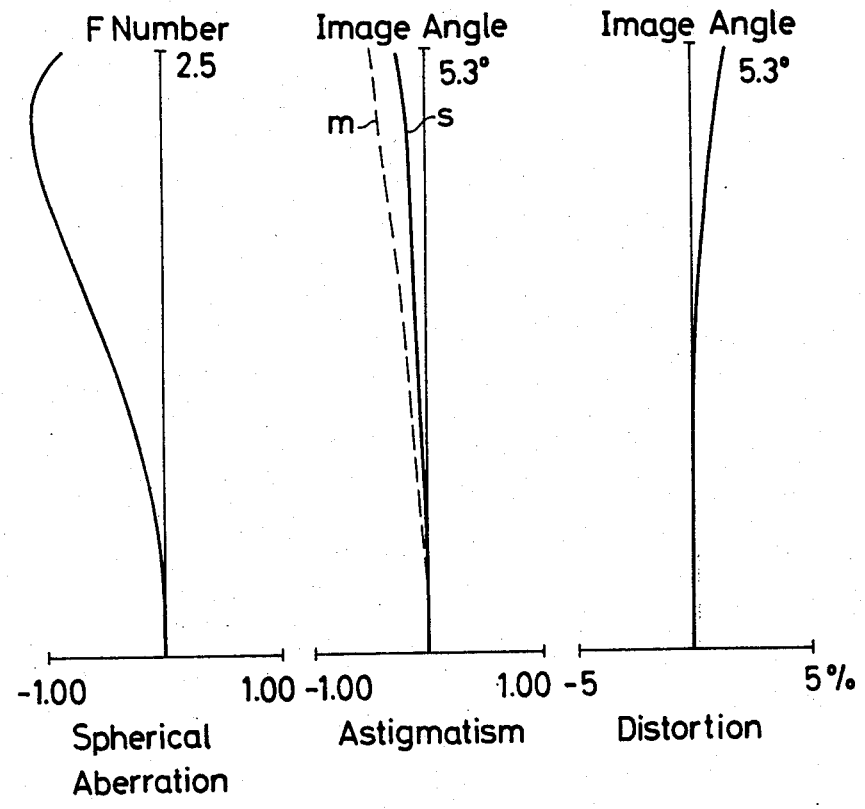
FIGS. 7, 8 and 9 are graphs of the spherical aberration, astigmatism and distortion of the zoom lens of FIG. 1 respectively when zoomed in the telephoto setting with object at a close up distance.

By reference to FIGS. 2 and 3, the process for deriving the above mentioned formula will next be explained. The condition under which focusing can be effected to suit differing object distances without shift of the image plane may be expressed as:

$$S'_{F\infty} = S'_F + t \quad \text{(1)}$$

wherein $S'_{F\infty}$ is the distance between the rear principal point of the second sub-group set in the infinitely focused position as shown in FIG. 2 and the image point with respect to the combined first and second sub-groups; and $S'_F$ is the distance between the rear principal point of the second sub-group set in a finitely focused position as shown in FIG. 3 and the image point with respect to the combined first and second sub-groups. In connection with FIGS. 2 and 3 it is to be noted that the movement amounts $S$ and $t$ shall be given the positive sign when the first and second sub-groups 11 and 12 are moved to the right of their infinitely focused positions. In the case of the lens of the present invention, therefore, $S$ and $t$ shall have the negative and positive signs respectively, as focusing is effected from infinity to closeups.

According to Herzberger "Gaussian Optics and Gaussian Brackets" in Journal of Optical Society of America Vol. 33, 1943 pp. 651–655, we have:

$$S'_{F\infty} = \frac{A}{C} \quad \text{(2)}$$

$$S'_F = \frac{A^*(a-S) + B^*}{C^*(a-S) + D^*}$$

$$= \frac{E - AS + F(S-t) - \phi_1(S-t)S}{G - CS + S\phi_2(S-t) - \phi_1\phi_2(S-t)S} \quad \text{(3)}$$

where
$A^* = A + \phi_1(S - t)$
$B^* = B + (S - t)$
$C^* = C + \phi_1\phi_2(S - t)$
$D^* = D + \phi_2(S - t)$ By putting formulae (2) and (3) into equation (1) and rearranging the result for $t$, we find the above mentioned relationship (c). A numerical example of the variation of $S$ and $t$ with focusing is given in Table 1 below for a specific zoom lens shown in Table 2 to be given later.

Table 1

| a | ∞ | −1274.5 | −741.7 | −513.3 | −386.4 | −305.7 |
|---|---|---------|--------|--------|--------|--------|
| s | 0 | −1.5    | −2.5   | −3.5   | −4.5   | −5.5   |
| t | 0 | 1.2     | 2      | 2.8    | 3.6    | 4.4    |

According to another feature of the present invention, the front lens group is provided in addition to the first and second sub-groups with the third sub-group intervening between those two parts of the complete zoom lens which may be moved either singly or in combination, whereby the otherwise resulted complexity of ray-tracing can be reduced to assist in achieving good stabilization of correction of the aberrations during zooming as the variation of inclination angle of a ray incident on the front surface of the zoom control part is made minimized. This lens arrangement also derives a design flexibility allowing the first and second sub-groups of reduced size along the optical axis of the lens as well as in the radial direction even when the entire system is set in the wide angle region with the extended angular field of view, provided that the front lens group fulfills the following requirement:

$$0.8fs < f_3 < 1.17fl \quad \text{(d)}$$

wherein $f_3$ is the focal length of the third sub-group; and $fs$ and $fl$ are the overall focal lengths of the front lens group when set in the shortest closeup position and in the infinitely focused position respectively.

When the lower limit is violated to increase the power of the third sub-group (or to decrease the focal length thereof), larger axial translations of the first and second sub-groups are required through the use of first and second sub-groups of correspondingly decreased powers to establish an equivalent range of focusing adjustments. This leads to an increase in the size of the complete zoom lens along the optical axis thereof. The aberrational correction is also disadvantageously affected. When the upper limit is violated to decrease the power of the third sub-group, the first and second sub-groups of correspondingly increased powers must have larger diameters. In addition thereto, as the heights of incidence of rays upon the first sub-group as well as upon the second sub-group are varied to increased extents during focusing, it is made more difficult to achieve good stabilization of correction of the aberrations throughout the entire focusing range.

An example of a specific front lens group with the first sub-group consisting of a negative meniscus singlet of forward convexity, a bi-concave singlet and a positive meniscus singlet of forward convexity, with the second sub-group consisting of a positive meniscus singlet of forward concavity, and with the third sub-group consisting of a negative meniscus singlet of forward convexity and two bi-convex singlets may be constructed in accordance with the numerical data given in Table 2 below for the radii, $r_1$ to $r_{14}$, the axial separations between the successive refracting surfaces, $d_1$ to $d_{13}$, along with the indices of refraction, $n$, for the spectral D line of sodium and the Abbe numbers, $v$, for the various lens elements. The minus values of the radii, $r$, indicate surfaces concave toward incident light.

Table 2

$F_1 = -57.12$ mm
$f_2 = 153.67$ mm
$f_3 = 62.85$ mm

| | r | d | n | v |
|---|---|---|---|---|
| 1 | 108.18 | 2.20 | 1.69680 | 55.5 |
| 2 | 40.00 | 18.35 | | |
| 3 | −134.40 | 2.20 | 1.64000 | 60.2 |
| 4 | 104.56 | 0.20 | | |
| 5 | 63.59 | 6.52 | 1.75520 | 27.5 |
| 6 | 118.37 | $d_6$ | | |
| 7 | −255.40 | 7.41 | 1.64000 | 60.2 |
| 8 | −71.81 | $d_8$ | | |
| 9 | 90.87 | 2.00 | 1.84666 | 23.9 |
| 10 | 44.33 | 0.25 | | |
| 11 | 45.30 | 10.70 | 1.64000 | 60.2 |
| 12 | 15578.94 | 0.20 | | |
| 13 | 61.73 | 8.23 | 1.64000 | 60.2 |
| 14 | −369.63 | | | |

Table 3 is a supplementary table relating the extreme focusing adjustments with the focal length, $f$, of the front lens group at 58.20 and 49.23mm for infinity and an object distance of 305.7mm respectively to their corresponding variable axial separation.

Table 3

| Object distance | f | $d_6$ | $d_8$ |
|---|---|---|---|
| Infinity | 58.20 | 5.64 | 10.47 |
| 305.7 mm | 49.23 | 15.54 | 6.07 |

According to a preferred embodiment of the present invention, the zoom objective of FIG. 1 can be constructed as by combining the front lens group specified in Tables 2 and 3 with the rest of lens groups having the parameters specified in Table 4 below.

Table 4

| No. | r | d | n | v |
|---|---|---|---|---|
| 15 | 49.11 | 1.00 | 1.77250 | 49.7 |
| 16 | 18.10 | 6.73 | | |
| 17 | −96.00 | 5.00 | 1.51118 | 51.0 |
| 18 | −15.39 | 0.80 | 1.77250 | 49.7 |
| 19 | 107.35 | 3.30 | | |
| 20 | −18.39 | 0.80 | 1.69680 | 55.5 |
| 21 | 171.64 | 2.74 | 1.92286 | 21.3 |
| 22 | −42.33 | $d_{22}$ | | |
| 23 | −205.29 | 5.80 | 1.56873 | 63.1 |
| 24 | −20.12 | 1.30 | 1.80518 | 25.4 |
| 25 | −26.75 | $d_{26}$ | | |
| 26 | diaphragm | 1.20 | | |
| 27 | 39.93 | 8.64 | 1.63980 | 34.6 |
| 28 | −46.85 | 1.40 | 1.77250 | 49.7 |
| 29 | 47.16 | 5.30 | | |
| 30 | 309.50 | 6.54 | 1.48749 | 70.1 |
| 31 | −38.22 | 1.40 | 1.80610 | 40.9 |
| 32 | −79.47 | 0.29 | | |
| 33 | 432.87 | 4.43 | 1.51633 | 64.1 |
| 34 | −89.34 | 18.40 | | |
| 35 | 92.90 | 8.80 | 1.48749 | 70.1 |
| 36 | −31.68 | 1.50 | 1.80610 | 40.9 |
| 37 | 79.14 | 0.30 | | |
| 38 | 57.15 | 8.69 | 1.51633 | 64.1 |
| 39 | −46.05 | 0.20 | | |
| 40 | 56.22 | 1.40 | 1.77250 | 49.7 |
| 41 | 26.29 | 10.76 | 1.51633 | 64.1 |
| 42 | −87.86 | 6.00 | | |
| 43 | plane | 72.60 | 1.51633 | 64.1 |
| 44 | plane | | | |

| Lens Separations during Zooming with Object at Infinity | | |
|---|---|---|
| | $d_{14}$ | $d_{22}$ | $d_{25}$ |
| Wide angle setting | 0.93 | 0.63 | 54.94 |
| Tele photo setting | 54.73 | 0.56 | 1.20 |

What is claimed is:
1. A zoom lens comprising:
a focusing lens part consisting of a front movable lens group, an intermediate movable lens group and a fixed lens group arranged in this order from the front;
a zooming part being positioned on the image side of said focusing lens part and consisting of a variation lens group and a compensation lens group; and
an image forming lens being positioned on the image side of said zooming part;
whereby, letting $f_1$ denote the focal length of the front movable lens group, and $f_2$ the focal length of the intermediate movable lens group, and with the positions which the front and intermediate movable lens groups occupy when focused to infinity regarded as reference positions, letting $a$ denote the distance from the principal point of the front movable lens group located in the reference position to an object, and $d$ the interval between the secondary principal point of the front movable lens group in the reference position and the primary principal point of the intermediate movable lens group in the reference position; as the two movable lens groups are moved to effect focusing for an object, letting S denote the amount of movement of the front movable lens group from the reference position and $t$ the amount of movement of the intermediate movable lens group from the reference position, the movement amount S and the movement amount $t$ satisfy the following relation:

$$t = -\frac{Y}{2X}\left(1 - \sqrt{1 - \frac{4 \times Z}{Y^2}}\right)$$

wherein
$X = CF\phi_2 - C\phi_1\phi_2 S$ $Y = -AF\phi_2 + A\phi_1\phi_2 S + CF - C\phi_1 S - CG + C^2 S - CF\phi_2 S + C\phi_1\phi_2 S^2$ $Z = AG + AF\phi_2 S - A\phi_1\phi_2 S^2 - EC - CFS + C\phi_1 S^2$ $A = 1 - \phi_1 d$ $B = -d$ $C = -\phi_1\phi_2 d + \phi_1 + \phi_2$ $D = 1 - d\phi_2$ $E = a \cdot A + B$ $F = a\phi_1 + 1$ $G = aC + D$ $\phi_1 = 1/F_1, \phi_2 = 1/f_2.$ 2. A zoom lens comprising:
a front lens group comprising first, second and third sub-groups in this order and having a positive refracting power;
an image forming lens group; and
a zooming part including a plurality of movable lens groups for zooming and arranged between said front lens group and said image forming lens group; said second sub-group having a positive refracting power, moving toward the image when focusing from infinity to a finite distance and having a magnifying power within a moving range, said first sub-group having a negative refracting power and being movable independently of said first sub-group.

3. A zoom lens according to claim 2, wherein said first sub-group includes a negative lens component, negative lens component and positive lens component.

4. A zoom lens according to claim 2, wherein said first sub-group consists of a negative meniscus lens, biconcave lens and a positive meniscus lens, and said second sub-group consists of a positive meniscus lens.

5. A zoom lens comprising:
a front sub-group which is movable at the time of focusing;
an intermediate movable sub-group which moves in a direction contrary to said front sub-group at the time of focusing, having a magnifying power to an object image of said front sub-group within its movable range, and is arranged closer to the image side than said front sub-group;
a rear sub-group which is fixed at the time of focusing and is arranged on the image side of said intermediate sub-group;
a zooming part including a plurality of lens groups movable for zooming, and being arranged on the image side of said rear sub-group; and
an image forming lens group being arranged closer to the image side than said zooming part.

6. A zoom lens according to claim 5, in which said front sub-group has a negative refracting power, while said intermediate sub-group and said rear sub-group have a positive refracting power.

7. A zoom lens according to claim 6, in which said intermediate sub-group includes a positive meniscus lens with its convex surface directed to the image.

* * * * *